(12) United States Patent
Cox, Jr.

(10) Patent No.: US 6,960,330 B1
(45) Date of Patent: Nov. 1, 2005

(54) METHOD FOR REDUCING H$_2$S CONTAMINATION

(76) Inventor: Henry Wilmore Cox, Jr., 1103 Kam Dr., Blacksburg, VA (US) 24060

(*) Notice: Subject to any disclaimer, the term of this patent is extended or adjusted under 35 U.S.C. 154(b) by 146 days.

(21) Appl. No.: 10/617,513

(22) Filed: Jul. 11, 2003

Related U.S. Application Data

(63) Continuation-in-part of application No. 10/361,274, filed on Feb. 10, 2003.
(60) Provisional application No. 60/395,602, filed on Jul. 12, 2002.

(51) Int. Cl.$^7$ ............................................. C01B 17/16
(52) U.S. Cl. .................................... 423/226; 423/242.2
(58) Field of Search ................................ 423/200, 226, 423/228, 242.2, 242.3

(56) References Cited

U.S. PATENT DOCUMENTS

| | | | | |
|---|---|---|---|---|
| 4,363,215 A | * | 12/1982 | Sharp ......................... | 60/641.2 |
| 4,960,576 A | * | 10/1990 | Bedell et al. ............... | 423/226 |
| 5,232,484 A | | 8/1993 | Pignatello | |
| 5,286,141 A | | 2/1994 | Vigneri | |
| 5,520,483 A | | 5/1996 | Vigneri | |
| 5,741,427 A | | 4/1998 | Watts et al. | |
| 6,063,346 A | * | 5/2000 | Luna ........................... | 423/220 |
| 6,160,194 A | | 12/2000 | Pignatello | |
| 6,319,328 B1 | | 11/2001 | Greenberg et al. | |

OTHER PUBLICATIONS

"Introduction to Hydrogen Peroxide", printed from the web on Apr. 2, 2003, 5 pages, published by US Peroxide of Laguna Niguel, CA and available on their web site at [www.h2o2.com/intro/overview.html].

"Soil Treatment –In situ chemical oxidation of contaminated soils (using hydrogen peroxide)", printed from the web on Apr. 2, 2003, 7 pages, published by US Peroxide of Laguna Niguel, CA, and available on their web site at [www.h2o2.com/applications/hazardouswaste/soil.html].

"BOD and COD Reduction Using Hydrogen Peroxide", printed from the web on Apr. 2, 2003, 5 pages, published by US Peroxide of Laguna Niguel, CA, and available at [www.h2o2.com/applications/industrialwastewater/bod-cod.html].

"Chlorinated Solvents Treatment", printed from the web on May 13, 2002, 1 page, published by Hydroxyl Systems of Sidney, British Columbia, Canada, and available on their web site at [www.hydroxyl.com/ind 06.htm].

"Groundwater Treatment", printed from the web on May 13, 2002, 2 pages, published by Hydroxyl Systems of Sidney, British Columbia, Canada, and available on their web site at [www.hydroxyl.com/ind 04.html].

"Fenton's Reagent –Iron–Catalyzed Hydrogen Peroxide", printed from the web on Apr. 28, 2003, 6 pages, published by US Peroxide, Laguna Niguel, CA, at [www.h202.com/applications/industrialwastewater/fentonsreagent.html].

Yunfu Sun et al., "Chemical Treatment of Pesticide Wastes. Evaluation of Fe(III) Chelates for Catalytic Hydrogen Peroxide Oxidation of 2,4–D at Circumneutral pH", Journal of Agricultural and Food Chemistry, Feb. 1992, pp. 322–327, vol. 40, American Chemical Society.

Joseph J. Pignatello et al., "Ferric Complexes as Catalysts for "Fenton" Degradation of 2,4–D and Metolachlor in Soil", Journal of Environmental Quality, Mar. –Apr. 1994, pp. 365–370, vol. 23, No. 2, Madison, WI.

Richard J. Watts et al., "Use of Iron Minerals in Optimizing the Peroxide Treatment of Contaminated Soils", Water Environment Research, Nov./Dec. 1993, pp. 839–844, vol. 65, No. 7.

Richard J. Watts et al., "Hazardous Wastes Assesment, Management, and Minimization", Water Environment Research,, Jun. 1994, pp. 435–440, vol. 66, No. 4.

Solomon W. Leung et al., "Degradation of Perchloroethylene by Fenton's Reagent: Speciation and Pathway", Journal of Environmental Quality, Jul. –Sep. 1992, pp. 377–381, vol. 21.

Susan J. Masten, "Ozonation of VOC's in the Presence of Humic Acid and Soils", 1991, pp. 287–312.

Daniel L. Pardiek et al., "Hydrogen Peroxide Use to Increase Oxidant Capacity for in Situ Bioremediation of Contaminated Soils and Aquifers: A Review", Journal of Contaminant Hydrology, 1992, pp. 221–242, No. 9, Elsevier Science Publishers B.V., Amsterdam.

Bryan W. Tyre et al., "Waste Management", Journal of Environmental Quality, Oct. –Dec. 1991, pp. 832–838, vol. 20.

Stephen S. Johnson, "Round Up the Usual Suspects", Forbes Science and Technology, Jan. 22, 1996.

Richard S. Greenberg et al., "In–Situ Fenton–Like Oxidation of Volatile Organics: Laboratory, Piolot, and Full–Scale Demonstrations", Remediation, Mar. 1998, pp. 29–42, John Wiley & Sons, Inc.

Amy L. Teel et al., "Comparison of Mineral and Soluble Iron Fenton's Catalysts for the Treatment of Trichloroethylene", Water Research, 2001, pp. 977–984, vol. 35, No. 4, published by Elsevier Science Ltd., Great Britain.

(Continued)

*Primary Examiner*—Stanley S. Silverman
*Assistant Examiner*—Edward M. Johnson
(74) *Attorney, Agent, or Firm*—Michael Haynes PLC

(57) ABSTRACT

Certain exemplary compositions, methods, and systems are disclosed that can be useful for reducing a concentration of a contaminant associated with a medium, which can be any substance or material, such as soil, water, air, and/or fluid. In one exemplary method, the medium is treated with Fe-MGDA and an oxidizing agent in amounts effective to oxidize at least a portion of the contaminant. It is emphasized that this abstract is provided to comply with the rules requiring an abstract that will allow a searcher or other reader to quickly ascertain the subject matter of the technical disclosure.

56 Claims, 2 Drawing Sheets

OTHER PUBLICATIONS

"Field Applications of In Situ Remediation Technologies: Chemical Oxidation", Sep. 1998, EPA 542–R–98–008, U.S. Environmental Protection Agency, Washington, D.C., and available at [www.epa.gov/swertiol].

"Inorganic Pollutant Dechlorination with Hydrogen Peroxide", printed from the web on May, 13, 2002, 3 pages, published by US Peroxide of Laguna Niguel, CA, and available at [www.h2o2.com/applications/industrialwastewater/dechlorination.html].

"Inorganic Pollutant Sulfide Oxidation Using Hydrogen Peroxide", printed from the web on May 13, 2002, 3 pages, published by US Peroxide of Laguna Niguel, CA, and available at [www.h2o2.com/applications/industrialwastewater/sulfideoxidation.html].

"Inorganic Pollutant Nitrogen Oxides (nox) Abatement with Hydrogen Peroxide", printed from the web on May 13, 2002, 3 pages, published by US Peroxide of Laguna Niguel, CA, and available at [www.h2o2.com/applications/industrialwastewater/nox.html].

"Inorganic Pollutant Arsenic Removal", printed from the web on May 13, 2002, 2 pages, published by US Peroxide of Laguna Niguel, CA, and available at [www.h2o2.com/applications/industrialwastewater/arsenic.html].

"Organic Pollutant Formaldehyde Oxidaiton", printed from the web on May 13, 2002, 2 pages, published by US Peroxide of Laguna Niguel, CA, and available at [www.h2o2.com/applications/industrialwastewater/hcho.html].

"Photographic Waste Treatment with Hydrogen Peroxide", printed from the web on May 13, 2002, 3 pages, published by US Peroxide of Laguna Niguel, CA, and available at [www.h2o2.com/applications/industrialwastewater/photowaste.html].

"Ground Water Treatment Hydrogen Sulfide Removal", printed from the web on May 13, 2002, 2 pages, published by US Peroxide of Laguna Niguel, CA, and available at [www.h2o2.com/applications/municipaldrinkingwater/h2sremoval.html].

"Surface Water Treatment Residual Ozone Destruction", printed from the web on May 13, 2002, 1 page, published by US Peroxide of Laguna Niguel, CA, and available at [www.h2O2.com/applications/municipaldrinkingwater/ozonedestruction.html].

"Landfill Leachate Treatment Systems", printed from the web on May 13, 2002, 2 pages, published by Hydroxyl Systems of Sidney, British Columbia, Canada, and available on their web site at www.hydroxyl.com/ind07.htm.

"Technical and Regulatory Guidance for In Situ Chemical Oxidation of Contaminated Soil and Groundwater", Jun. 2001, Prepared by Interstate Technology and Regulatory Work Group in Situ Chemical Oxidation Work Team.

* cited by examiner

METHOD FOR REDUCING H₂S CONTAMINATION

This application claims priority to, and incorporates by reference in its entirety, the following pending provisional U.S. patent application:

Ser. No. 60/395,602, filed 12 Jul. 2002.

This application is a continuation-in-part of, claims priority to, and incorporates by reference in its entirety, the following pending U.S. patent application:

Ser. No. 10/361,274, filed 10 Feb. 2003.

BRIEF DESCRIPTION OF THE DRAWINGS

Certain exemplary embodiments of the invention will be more readily understood through the following detailed description, with reference to the accompanying drawings, in which.

DETAILED DESCRIPTION

Figure 1:
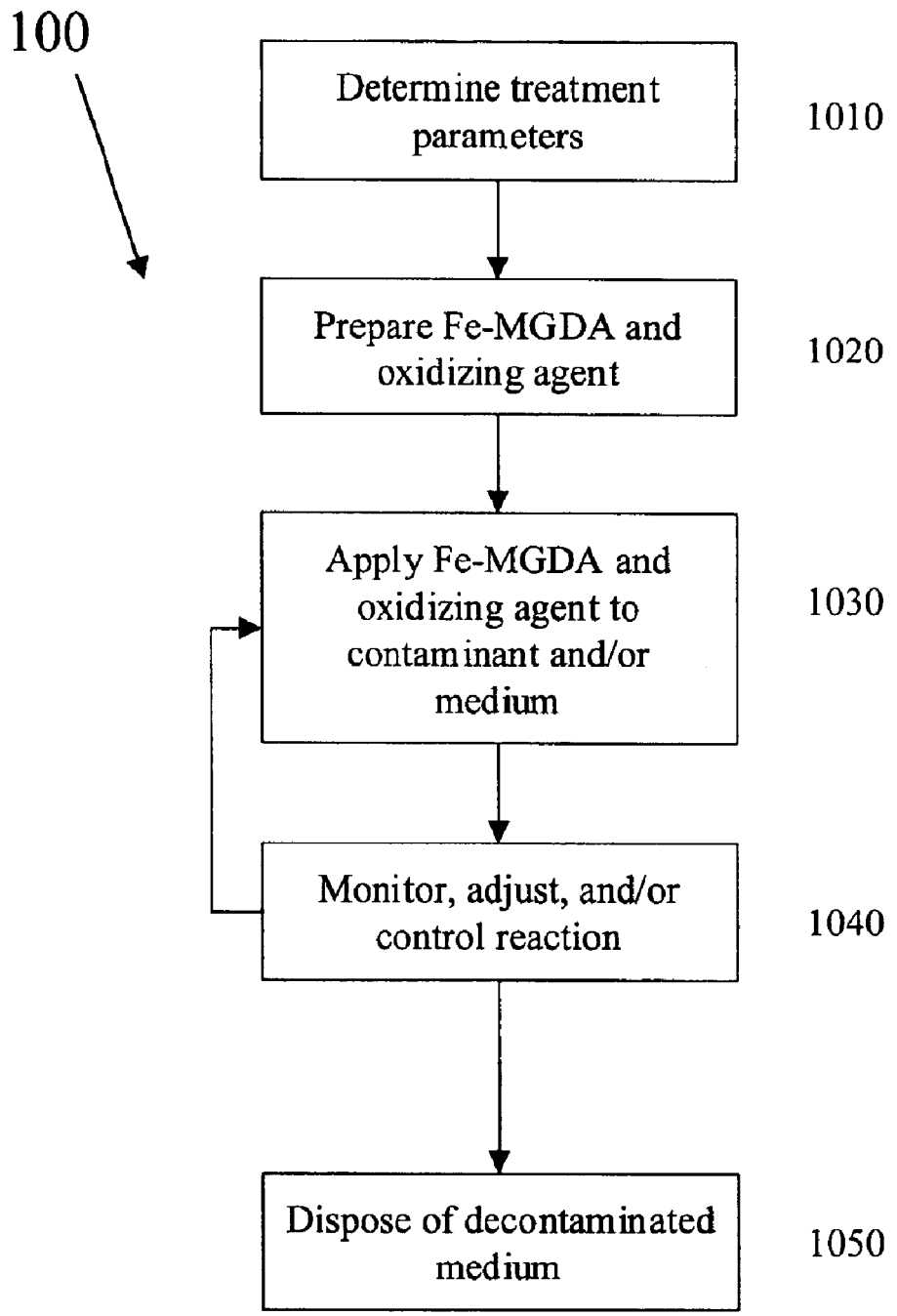
FIG. 1 is a flowchart of an embodiment of a method 100 of the present invention.
Figure 2:
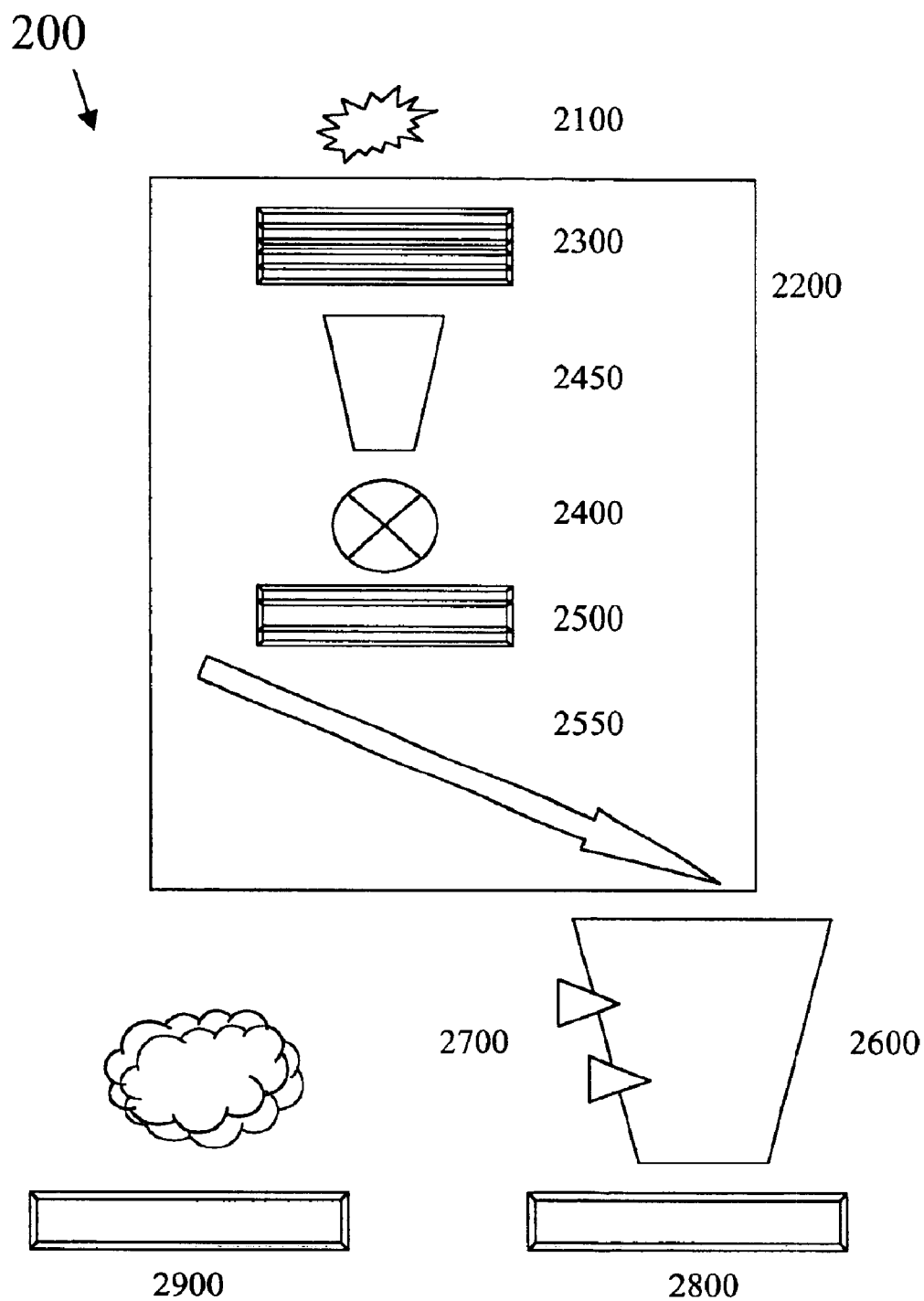
FIG. 2 is a block diagram of a system 200 of the present invention.

The present invention generally relates to compositions, methods, and systems, embodiments of some of which can be useful for remediating contamination. Moreover, certain embodiments of compositions, methods, and/or systems of the present invention can be useful for reducing a concentration of a contaminant associated with a medium by treating the medium with ferric methylglycinediacetate (Fe-MGDA) and an oxidizing agent in amounts effective to oxidize at least a portion of the contaminant.

It is not currently known with certainty exactly how certain embodiments cause the reduction in concentration of the contaminant, and particularly, the precise reaction mechanism is currently unproven. Nevertheless, several potential theories to describe the mechanism of the reaction are recognized by the inventor of the present invention.

According to certain theories, hydroxyl radicals, free radicals, or both react with and degrade at least the target contaminant. As a foundation for these theories, it is recognized by the inventor that numerous contaminated media, including soil and water, can be treated by the application of oxidants. The following table lists several oxidants and their oxidation potential:

| Oxidant | Oxidation Potential, V |
| --- | --- |
| Fluorine | 3.0 |
| Hydroxyl radical | 2.8 |
| Ozone | 2.1 |
| Hydrogen peroxide | 1.8 |
| Potassium permanganate | 1.7 |
| Chlorine dioxide | 1.5 |
| Chlorine | 1.4 |

As shown in preceding table, hydrogen peroxide is a relatively powerful oxidant. Also shown in the preceding table is the much more powerful hydroxyl radical, a type of free radical, which is second in the list only to fluorine in its oxidation potential. During certain oxidation processes, such as those involving hydroxyl and/or other free radicals, organic contaminants can be completely, or nearly completely mineralized to carbon dioxide, oxygen, water, and a small amount of mineral acids or salts.

For example, hydroxyl radicals can destroy phenols, MTBE, BTEX (benzene-toluene-ethylbenzene-xylenes), pesticides, solvents, plasticizers, chelants, chloroethenes, petroleum hydrocarbons, BOD and COD (biological oxygen demand/chemical oxygen demand) contributing compounds, and virtually any other organic requiring treatment. Moreover, hydroxyl radicals can atmospherically degrade polyfunctional oxygenated compounds, such as diethers and hydroxyethers, as well as aliphatic alcohols, ethers, carbonyls, ketones, and alkanes. Further, hydroxyl radicals can disinfect process waters and biological effluents, and can decompose amino acids.

Also, hydroxyl radicals can treat water containing chemical warfare agents (e.g., Sarin, Tabun, VX, GF, GX, Cyanide, Soman, mustard gas, etc.); pathogens & biological warfare agents (e.g., bacteria, viruses, anthrax, cryptosporidium, etc.); soil and water contaminants (e.g., MtBE, EtBE, BTEX, chlorinated solvents, DCA, TCA, haloalkanes, methylene chloride, NDMA, carbon tetrachloride, haloalkenes, vinyl chloride, DCE, TCE, PCE, chloroform, acetones, ketones, cyanides, acrylonitriles, phenols, formaldehyde, alcohols, glycol ethers, etc.); ordnance, propellants, and energetic compounds (e.g., TNT, RDX, NDMA, etc.); pharmaceutical residuals (e.g., endocrine disruptors, estrogen, antibiotics, etc.); and/or pesticides (e.g., Dieldrin, Atrazine, IPC, 2,4-D, DDT, etc.), etc.

Documents that describe certain applications of oxidants include "Introduction to Hydrogen Peroxide", published by US Peroxide of Laguna Niguel, Calif., and available on their web site at [www.h2o2.com/intro/overview.html]; "Soil Treatment—In situ chemical oxidation of contaminated soils (using hydrogen peroxide)", which is published by US Peroxide of Laguna Niguel, Calif., and available on their web site at [www.h2o2.com/applications/hazardouswaste/soil.html]; "BOD and COD Reduction Using Hydrogen Peroxide", which is published by US Peroxide of Laguna Niguel, Calif., and available at [www.h2o2.com/applications/industrialwastewater/bodcod.html]; and "Water Supply Protection Systems", "Chlorinated Solvents Treatment", and "Groundwater Treatment", which are each published by Hydroxyl Systems of Sidney, British Columbia, Canada, and available on their web site at [www.hydroxyl.com/pdf/water_supply_protection.pdf], [www.hydroxyl.com/ind_06.htm], and [www.hydroxyl.com/ind_04.htm], respectively; each of which is incorporated herein by reference in its entirety.

Hydroxyl radicals can be generated during processes involving the catalyzed activation of hydrogen peroxide using such metals as iron, copper, manganese, and/or other transition metal compounds. One group of such processes is Fenton-type chemical reaction systems, which employ ferrous salts and hydrogen peroxide in acidified (pH ~2 to 3) soil or water suspensions.

In the classic Fenton reaction (Equation 1, below), ferrous ion rapidly reduces hydrogen peroxide to primarily hydroxyl radicals, which can react with and degrade a target contaminant. The reaction involves hydrogen peroxide and a ferrous iron catalyst. The peroxide is broken down into a hydroxide ion and a hydroxyl free radical. The hydroxyl free radical is the primary oxidizing species and can be used to oxidize and break apart organic molecules.

$$H_2O_2 + Fe^{2+} \rightarrow Fe^{3+} + HO^- + HO^* \qquad \text{(Equation 1)}$$

A further description of Fenton-type reactions is provided in "Fenton's Reagent—Iron-Catalyzed Hydrogen Peroxide", which is published by US Peroxide, Laguna Niguel, Calif., at [www.h2o2.com/applications/industrialwastewater/fentonsreagent.html], which is incorporated by reference herein in its entirety.

In the classic Fenton reaction, ferrous ion is required in stoichiometric amounts. Peroxide demand, and therefore, ferrous ion demand can be high in certain media, such as soil for example, due to competitive oxidation of soil organic matter and soil-catalyzed decomposition. Ferrous ion also can be oxidized by the hydroxyl radicals, and therefore can compete with the target compounds unless its concentration is kept low by gradual addition in dilute form.

Ferric ion can also produce hydroxyl radicals from peroxide, albeit at a slower rate than ferrous ion. The use of ferric ion, however, typically requires acidic conditions to keep the iron soluble; the reaction has an optimum pH of about 3. In certain media, such as soil for example, acidification to an optimum pH of 3 can be challenging because soil can have a high buffering capacity. Moreover, because acidification itself can be viewed in at least some circumstances as a polluting practice, in some cases the soil must be excavated for treatment and neutralized before replacement. Similar concerns can exist for processes causing the acidification of contaminated water, air, vapors, and/or surfaces.

As used herein, the term "ferric chelate" means any one of a number of organic and inorganic polydentate ligands complexed with ferric ion, Fe(III). An "active" ferric chelate is one that exhibits activity toward oxidation of the contaminant to be degraded, i.e., is capable of generating free radicals or other reactive oxidants from an oxidant (also referred to as an "oxidizing agent" herein), such as a peroxide or a persulfate in the presence of a medium associated with the contaminant.

Certain embodiments of the present invention are based, at least in part, on the surprising discovery that a particular novel active ferric chelate, Fe-MGDA, and selected oxidizing agents unpredictably demonstrate significant activity at oxidizing contaminants associated with a medium above and beyond the activity which would be expected in the presence of the selected oxidizing agent alone.

Thus, one embodiment of the present invention includes a method for reducing a concentration of a contaminant associated with a medium, comprising treating the medium with Fe-MGDA and an oxidizing agent in amounts effective to oxidize at least a portion of the contaminant. Another exemplary embodiment comprises a method to substantially prevent production of a contaminant associated with a medium.

The oxidizing agent can be a peroxide, such as hydrogen peroxide, calcium peroxide, and/or magnesium peroxide, etc.; a persulphate, such as sodium persulphate, potassium persulphate, and/or ammonium persulphate, etc; ozone; a permanganate, such as sodium permanganate, potassium permanganate, etc; chlorine dioxide; and/or a halogen, such as chlorine, bromine, iodine, and/or fluorine, etc.

The medium can be any substance or material, such as solids, water, air, and fluid. For example, the medium can be a naturally occurring solid, such as earth, soil, clay, dust, sand, gravel, stone, rock, sediment, and/or activated charcoal. As another example, the medium can be any solid that is considered a waste, such as rubbish, trash, refuse, medical waste, radioactive waste, sweepings, scourings, rubble, debris, detritus, scum, grease, sludge, sewage, jetsam, and/or flotsam, etc.

As a yet another example, the medium can be any liquid, such as water, groundwater, leachate, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, and/or spent ultra-pure water, etc.

As a further example, the medium can be any fluid, such as air, vapor, liquid, exhaust, and/or vent gas, etc. Moreover, the fluid can occupy a space defined at least in part by a structure, such as for example, a tunnel, mine, well, ditch, canyon, cavern, cave, hole, corner, niche, bunker, building, compartment, room, clean room, enclosure, container, tank, pipe, equipment, ship, airplane, vehicle, automobile, and/or train, etc. A structure can be airtight or vented.

Moreover, the medium can be any surface, including a building, compartment, facility, pavement, floor, flooring material, wall, divider, corner, door, window, shade, ceiling, roof, lid, tent, tarp, casing, envelope, covering, skin, wrapper, sheathing, veneer, surface, substrate, tray, ledge, shelf, container, fixture, appliance, equipment, machine, mechanism, apparatus, device, furniture, furnishing, protective gear, clothing, footwear, safety equipment, military product, military equipment, industrial product, industrial equipment, commercial product, commercial equipment, consumer product, consumer equipment, unfinished product, unfinished equipment, laboratory equipment, laboratory device, laboratory supply, medical equipment, medical device, medical supply, decontamination chamber, vessel, storage tank, pipe, valve, pump, blower, tubing, duct, conveyance system, silo, tanker, well, and/or oil well, etc.

The contaminant can be any contaminating substance that can be oxidized, such as, for example, a chemical compound, chemical mixture, organic compound, inorganic compound, hydrogen sulfide, and/or biological, etc. As a further example, the contaminant can be an organic compound, an organic compound having at least one aromatic functional group, and/or an organic compound having at least one aliphatic functional group, etc.

As yet another example, the contaminant can be gasoline, MtBE, EtBE, BTEX (benzene-toluene-ethylbenzene-xylenes), chlorobenzene, chlorotoluene, dichlorobenzene, dichloroethene, tetrachloroethene, trichloroethene, benzo (a) pyrene, benzo (b) fluoranthene, benzo (k) fluoranthene, chrysene, dibenz (a,h) anthracene, indeno (1,2,3-cd) pyrene, cis-dichloroethene, trans-dichloroethene, hydrazine, and/or diaminotoluene; phenol; chlorinated solvents, DCA, TCA, haloalkanes, methylene chloride, NDMA, carbon tetrachloride, haloalkenes, vinyl chloride, DCE, TCE, PCE, chloroform, acetones, ketones, cyanides, acrylonitriles, phenols, formaldehyde, alcohols, glycol ethers, chlorinated solvents (e.g., polychlorinated biphenyls (PCBs), pentachlorophenol (PCP), etc.), chemical warfare agents (e.g., Sarin, Tabun, VX, GF, GX, Cyanide, Soman, mustard gas, etc.), ordnance, propellants, and energetic compounds (e.g., TNT, RDX, NDMA, etc.), human and/or animal drugs and/or pharmaceuticals (e.g., endocrine disruptors, estrogen, steroids, antibiotics, pain relievers, caffeine, etc.), pesticides (including any compound used to deter and/or destroy pests, including herbicides, fungicides, insecticides, rodenticides, and the like, e.g., Dieldrin, Atrazine, IPC, 2,4-D, DDT, N-N-diethyltoluamide, etc.), plasticizers, chelants, fire retardants (e.g., tri (2-chloroethyl) phosphate), disinfectants (e.g., triclosan), detergent metabolites (e.g., 4-nonylphenol), chloroethenes, petroleum hydrocarbons, BOD and COD (biological oxygen demand/chemical oxygen demand) contributing compounds, polyfunctional oxygenated compounds, such as diethers and hydroxyethers, as well as aliphatic alcohols, ethers, carbonyls, ketones, alkanes, naphthalenes, lubricants, cyanides, mercaptans, and/or virtually any other organic requiring treatment, etc.

Furthermore, the contaminant can be a biological, such as any lifeform, pest, plant, invertebrate, mollusk, nematode, insect, parasite, mold, fungi, protozoa, amoeba, bacteria, virus, prion, protein, and/or amino acid, etc., including pathogens and biological warfare agents such as for example, smallpox, Ebola, cholera, typhoid, anthrax, plague, and/or cryptosporidium, etc.

Numerous embodiments of the invention are possible. The following exemplary embodiments are intended to merely illustrate, and not limit, the breadth and depth of embodiments that can fall within the scope of the appended claims and future claims, which define the invention.

Method 100

FIG. 1 is a flowchart of an exemplary embodiment of a method 100 of the present invention. Method 100 can begin at activity 1010 by determining the treatment parameters. Included in this determination can be activities such as sampling the medium to detect if a contaminant is present, analyzing the sample or the medium to identify the contaminant(s) and/or to determine what concentrations of the contaminant are present, determining an amount of the medium to treat, determining where to treat the medium (e.g., in situ, ex situ, or both), and/or determining temperatures, pressures, and/or flowrates of the medium, the Fe-MGDA, and/or the oxidizing agent.

At activity 1020, effective amounts of the Fe-MGDA and/or the oxidizing agent can be prepared. One method of preparing Fe-MGDA is to directly mix with MGDA a source of ferric ion, such as an aqueous solution of a ferric salt, such as ferric perchlorate, ferric nitrate, ferric citrate, ferric malate, ferric lactate, and/or ferric oxalate, etc. Another method is to mix a liquid ferric chloride solution with MGDA. Ferric chloride can be purchased as a ~13% ferric solution with a pH of about 1.0 to about 1.5 from Vopac, 825 Fisher Street, Martinsville, Va., in 55 gallon drum and tanker load quantities.

The chelating agent MGDA, which is sometimes referred to as methylglycinediacetate and/or as trisodium methylglycinediacetate, can be purchased from BASF Corp, 3000 Continental Drive—North, Mount Olive, N.J., 07828-1234, under their product name, Trilon M. It can be purchased as a 39% concentrated liquid in 55 gallon drum and tanker load quantities. Trilon M has a density of 1.29–1.33 g/cm3, a pH of about 10.0 to about 12.0, and a molecular weight of MGDA-Na3: 271.

Formulation of one liter of the ferric chelate Fe-MGDA (sometimes referred to herein as VTX) can be made by adding 52.3 milliliters (~27 grams of MGDA—Na3 depending on density) of Trilon M liquid to approximately 800 milliliters of water. This solution can be then mixed continuously with a magnetic stir bar or other mechanical mixing technique. Liquid ferric chloride solution can be added to the solution while the pH of the mixture is monitored. The pH of Trilon M/water mixture can be from 10 to 12 initially. Ferric chloride can be added until the pH of the solution comes down to a pH of about 5.0. Water can be added to achieve a final volume of 1000 millimeters. At this point the Fe-MGDA can be ready for use. Larger volumes can be produced by scaling-up this formulation. In various alternative embodiments, liquid ferric chloride solution can be added to undiluted MGDA.

The Fe-MGDA can be applied to a contaminated medium before, during, in combination with, and/or after an oxidizing agent in amounts and/or concentrations effective to degrade, and/or substantially reduce the concentration of, the target contaminant. The amounts of Fe-MGDA and oxidizing agent needed and/or utilized can depend upon, for example, the concentration of the contaminant(s) to be degraded, the available reaction time, temperature of the reactants (e.g., the Fe-MGDA, the oxidizing agent, and/or the contaminated medium), and/or the organic matter content of the medium.

In certain embodiments, the Fe-MGDA and the oxidizing agent can be mixed, and even conveyed, before being applied to the contaminated medium. In other embodiments, the Fe-MGDA and the oxidizing agent can mix while in contact with the contaminated medium.

At activity 1030, the Fe-MGDA and the oxidizing agent can be applied to the contaminant, the medium, and/or the contaminated medium. Either of the Fe-MGDA and the oxidizing a gent can be applied as solid, liquid, vapor, aerosol, and/or foam.

For example, a ferric chelate and an oxidizing agent can contact the contaminated medium in the presence of water, such as in an aqueous soil slurry. In this context, the term "slurry" can mean a mixture containing sufficient water to moisten and saturate the soil and coat the soil particles, i.e., making "mud". In certain embodiments, sufficient water can be utilized to actually suspend the soil particles.

In some embodiments involving soil, chelate and oxidizing agent solutions can be employed, and these can simply be added to the soil at ambient temperature, so long as there is sufficient water present in the final mud to allow penetration of the ingredients. Also, more concentrated oxidizing agent and chelate solutions can be mixed into soil that has been recently moistened or watered. Moreover, oxidizing agent and chelate can be sprayed on freshly plowed earth, and sunlight can speed degradation. In other embodiments, ultra-violet light and/or other forms of light, radiation, and/or energy, can be utilized to speed degradation.

At activity 1040, the reaction between the Fe-MGDA, oxidizing agent, and the contaminant can be monitored, adjusted, and/or controlled. For example, included in this activity can be activities such as sampling the medium to detect if a contaminant is still present, analyzing the sample or the medium to identify what contaminant(s) remains and/or to determine what concentrations of the contaminant remain, and/or monitoring, adjusting, and/or controlling temperatures, pressures, and/or flowrates of the contaminated medium, the Fe-MGDA, the oxidizing agent, and/or the decontaminated medium.

To increase the temperature, pressure, and/or rate of the reaction, an accelerant can be added to, for example, the contaminated medium, the Fe-MGDA, the oxidizing agent, and/or the reacting mixture. Such an accelerant can be, for example, an organic compound and/or biological that can react rapidly with the Fe-MGDA and the oxidizing agent. Such an approach could be useful for fragmenting soil clods that contain a relatively low-level of contaminant, thereby increasing the available surface area of the soil and decreasing the time required to contact the contaminant with the other reactants, and/or decreasing the amount of Fe-MGDA and/or oxidizing agent. Similarly, a non-toxic organic accelerant could be put into sub-surface groundwater to cause substantial bubbles to be formed during the reaction, thereby lifting the oxidants up to the soil/water interface where the target contaminants might be located.

During the reaction, at least a portion of the contaminant can be oxidized, decontaminated, and/or sanitized. In the case of biologicals, the reaction can kill a life form, render ineffective an amino acid, and/or denature a protein. The reaction can be particularly handy for decontaminating a cleanroom, sanitizing military equipment, and/or reducing a concentration of a contaminant associated with bioterrorism. As a result of the reaction, the concentration of the contaminant can be reduced by a factor of, for example, at least 2, 5, 10, 20, 50, 100, 200, 500, 1000, 2000, 5000, 10000, 20000, and/or 50000, etc.

Heat generated by the reaction can be captured, transferred, and/or utilized. For example, the reaction can occur within a reactor vessel that is surrounded by cooling coils. The heat absorbed by a heat transfer fluid circulating in the coils can be used for any heating purpose, such as to dry the decontaminated medium (e.g., to de-water decontaminated soil and/or to dry a decontaminated surface), and/or to heat another process, fluid, and/or environment.

Moreover, the reaction can occur with such intensity as to create a controlled and/or uncontrolled explosion. A controlled explosion can be used, for example, to generate propulsion, and/or to create a mechanical cleaning effect. As a further example, the pressure, temperature, and/or decontamination caused by a sufficiently rapid reaction down-hole in an oil well can "frac" the well, thereby removing and/or dislodging substances clogging the well and improving a flowrate of the oil well.

The reaction can be allowed to run its course, and/or can be halted, for example, before complete oxidation of the contaminant has occurred. Adding an additional oxidizable substance to the medium, thereby diverting some of the oxidants to the additional substance and/or consuming the oxidants' oxidizing capability can cause such a halting. Moreover, such a halting of the reaction, or at least a decrease in the reaction rate, can also occur by reducing and/or limiting the flow of the reactants (e.g., either Fe-MGDA, the oxidizing agent, the contaminated medium, and/or the additional oxidizable substance), changing the concentration of any of the reactants, lowering the temperature of any of the reactants, and/or by withdrawing heat generated by the reaction.

After the reaction, the medium can be treated to reduce a concentration of iron associated with the medium. The medium can also be re-treated to further reduce a concentration of the contaminant.

At activity 1050, the decontaminated medium can be disposed. Prior to disposal, however, the medium can be sampled to detect if any contaminant is still present, analyzed to identify what contaminant(s) remain, and/or to determine what concentrations of the contaminant are present. Further, a determination can be made regarding how much reduction has occurred in the target contaminant(s).

Also, the decontaminated medium can be conveyed to a disposal site, and can be discharged at the disposal site. The disposal site can be, for example, the atmosphere, a waterway, an injection well, and/or a landfill.

System 200

Exemplary embodiments of the present invention can employ a system 200 for treating a contaminated medium.

One such exemplary embodiment can be used for treating contaminated soil. In this embodiment, each particle of contaminated soil can be saturated with both the oxidizing agent (hydrogen peroxide in this example) and Fe-MGDA. As used herein, "hydrogen peroxide" refers to a fluid solution of hydrogen peroxide and solvent, with the concentration of hydrogen peroxide ranging from approximately 0.01% to about 100%. An exemplary embodiment of a solvent for hydrogen peroxide can be water. Thus, as is apparent in the experimental results presented later in this application, "hydrogen peroxide" can refer to an aqueous hydrogen peroxide solution. Dose rates can vary with contaminant and background soil demand for the oxidants generated by the reactants.

Aliquots of contaminated soil can be exposed to varying levels of hydrogen peroxide and Fe-MGDA. Once treated, the soil can be tested for the target contaminants to determine the efficacy of individual dose rates. Generally speaking, a dose rate of 35% hydrogen peroxide for moderately contaminated soil (i.e. ~1000 parts per million (PPM) of target contaminant) will range from 0.004% to 0.012% by weight of hydrogen peroxide to soil. Fe-MGDA can be added at the same weight to weight ratio as the hydrogen peroxide, when made up as a 0.1 molar solution. Deviations from this range can be employed. For example, excessive moisture levels inherent within a target soil can suggest use of a more concentrated treatment solution that could decrease concerns for over-wetted soil.

Once the appropriate dosage of hydrogen peroxide and Fe-MGDA are determined, the contaminated soil 2100 can be fed through a soil screening plant 2200. Soil screening plants are commonly available from a number of suppliers including Power Screen, Inc. and Extec, Inc. The soil screen can be equipped with a "grizzly" 2300 (a large vibrating grid of, for example, 6" wide steel girders), for removing large debris from the soil and/or a hammermill/shredder 2400, and which can effectively reduce soil particle size to approximately one inch.

Soil can be loaded with a front end loader or backhoe onto the "grizzly" 2300, which can screen large debris from the soil. Soil can fall through the "grizzly" 2300 into a hopper 2450 where the hammermill/shredder 2400 can be located. Once pulverized with the hammermill/shredder 2400, the soil can fall onto a vibrating screen 2500 which can effectively reduce soil particle size to less than about one-half inch. Soil falling through the screen vibrating 2500 can land on a conveyor belt 2550 where it can be transported to the exit point of the screening plant.

As the soil free falls from the conveyor system 2550 it can fall through a shroud 2600. Inside of the shroud 2600 can be located numerous (e.g., 32) individual spray nozzles 2700 which can deliver the prescribed dosage of hydrogen peroxide and Fe-MGDA. Each product can be sprayed separately through a dedicated bank of nozzles 2700 for each product. Nozzles 2700 within the shroud 2600 can be placed in a pattern, such as a circular or helical pattern. Soil can fall through the pattern of nozzles 2700 so that the soil can be spayed from numerous angles. Fe-MGDA can be sprayed first followed immediately by the hydrogen peroxide. Control of the spray volume to soil ratio can be controlled by knowing the soil processing rate through the equipment and matching this rate to predetermined volumes being sprayed onto the soil as can be indicated by totalizing flow controls for each fluid.

Soil exiting the treatment unit can fall into a lined pit 2800 where the soil can be excavated with rubber-tired loaders and placed into a final treatment cell 2900 for finalized oxidation, cooling, and/or dewatering. Soil can be tested after a predetermined time, (e.g., about three hours) for cleanliness.

Alternatively methods for applying the chemicals to soil are contemplated. For example, a pug mill could be used to mix the chemicals into the soil via an auger arrangement. As another example, one could simply spray the chemicals onto the soil and mix them in with heavy equipment such as a backhoe, or even simply roto-till them into the soil.

The degradation reaction employed in at least one embodiment of a method of the invention can occur at the pH of the soil, which can range from approximately 3.5 to approximately 8, or from approximately 5 to approximately 7, or more typically approximately 6. Usually, no acidification of the slurry is required, and typically, degradation can occur even where the soil buffers the reaction.

Thus, certain embodiments of a method of the invention can be used to reduce contaminants associated with surfaces, solids, water, air, and/or fluids generally. Embodiments of a method of the invention can cause insignificant sludge production, can work on cloudy effluents, and/or can work at circumneutral pH. For certain embodiments of the invention, the Fe-MGDA and/or oxidizing agent can be in any fluid form, including liquid, vapor, and/or aerosol form.

Exemplary embodiments of systems of the present invention can be implemented as stand-alone systems, combined with each other, and/or with pre-treatment processes such as bioremediation and/or solids separation. Moreover, such exemplary embodiments of systems of the present invention can be fully integrated, self-contained, skid-mounted, portable, weatherproof, tolerant of suspended dissolved solids and color, highly energy efficient, remotely monitored, equipped with 100 percent duplicity of all components, and/or fully automatically PLC controlled. Further, such systems can have built-in heating; venting; sump; digital operator interface; and/or flow, concentration, pH, temperature, and pressure instrumentation and/or controls.

EXAMPLES

Example 1

Degradation of MtBE

Variable amounts of 0.1 molar Fe-MGDA were added, in three separate studies, to a fixed amount of hydrogen peroxide and a proportional amount of MtBE.

Two catalytic studies were conducted. In Study 1 a solution containing 1.5 L of distilled water, approximately 0.2 g of sodium bicarbonate, and 0.150 mL MtBE (~100 PPM) was prepared with magnetic stirring at room temperature in a 2.5 L flask. The dissolved sodium bicarbonate increased the alkalinity of the water somewhat, and causing the water to mimic a natural water source. This solution was distributed in two 500 mL Erlenmeyer flasks. A 0.500 mL aliquot of Fe-MGDA was added to the first flask. The second flask was a control and had no chelate added to it. After the addition of chelate, 0.500 mL of hydrogen peroxide was added to the first flask.

The flasks were then covered with parafilm and swirled to facilitate mixing of the solution. After four hours a sample from each flask was taken and analyzed by gas chromatography coupled with mass selective detection (GC-MS) using the conditions specified in Table 1.

TABLE 1

| | GC-MS Conditions |
|---|---|
| Injector | 250° C., 1 μL injection, split ratio 20:1 |
| Detector | MS SCAN mode 32–300 amu, 2 min. solvent delay |
| Temperature Program | 40° C. (hold 3 min) to 150° C. (hold 5 min) @ 20° C./min |
| Carrier Gas | Helium |
| Average Linear Velocity | 36 cm/sec |

Study 2 followed the same procedure as Study 1, however, a higher dosage of chelate (1.000 mL) was added to the first flask. The reaction for Study 3 was also the same as for Study 1 except that 1.500 mL of chelate was added to the first flask.

Study 4 was designed to test the efficacy of the chelate when the flask was purposely under-dosed with chelate and hydrogen peroxide in an effort to determine the optimum destructive rates of the chelate. Table 2 outlines the dosage rates for chelate and hydrogen peroxide.

TABLE 2

| Specifications for Study 4 | | | |
|---|---|---|---|
| | Fe-MGDA Flask 1 | Fe-MGDA Flask 2 | Fe-MGDA Flask 3 |
| Chelate Added (mL) | 0.500 | 1.000 | 1.500 |
| MtBE Added (mL) | 0.200 | 0.200 | 0.200 |
| | ~400 PPM | ~400 PPM | ~400 PPM |

For studies 1–3 the MtBE peak area of the chelate was compared to the MtBE peak from the control flask in each respective study. The results are as seen in Table 3 below.

Table 3 below illustrates the degradation of MtBE after four hours.

TABLE 3

| | Chelate Added (mL) | | | MtBE Added (mL) | | | Percent Degradation of MtBE Compared to Control | | |
|---|---|---|---|---|---|---|---|---|---|
| | Study 1 | Study 2 | Study 3 | Study 1 | Study 2 | Study 3 | Study 1 | Study 2 | Study 3 |
| Fe-MGDA | 0.500 | 1.000 | 1.500 | 0.050 | 0.100 | 0.100 | 95 | 96 | 95 |

The Fe-MGDA appears to have been equally effective at all dosages at 95–96%.

Study 4 (Table 4) shows that Fe-MGDA showed similar degradation percentages for all dosages with only slight variation between the dosage rates.

TABLE 4

| Dosage Rate Study | | | |
|---|---|---|---|
| | Fe-MGDA | | |
| Chelate Added (mL) | 0.500 | 1.000 | 1.500 |
| MtBE Added (mL) | 0.200 | 0.200 | 0.200 |
| Percent Degradation of MtBE Compared to Control | 68 | 73 | 66 |

Example 2

Degradation of Trichloroethylene (TCE) and Tetrachloroethylene (PCE)

In this comparative test, variable amounts of Fe-MGDA were applied, in three separate studies, to a fixed amount of hydrogen peroxide and a proportional amount of TCE and PCE. The purpose of the studies was to find what amount of chelate was most efficient at degrading TCE and PCE.

Study 1: A solution containing 2.5 L of distilled water, approximately 0.5 g of sodium bicarbonate and 0.125 mL each of TCE and PCE was prepared with magnetic stirring at room temperature in a 5 L flask. This solution was distributed into three 500 mL Erlenmeyer flasks. Varying aliquots of chelate were added to each flask as seen in Table 5. After the addition of chelate, hydrogen peroxide (35%) was added to each 500 mL flask.

TABLE 5

Specifications for Example 2, Study 1

|  | Fe-MGDA Flask 1 | Fe-MGDA Flask 2 | Fe-MGDA Flask 3 |
|---|---|---|---|
| Chelate Added (mL) | 0.500 | 1.000 | 1.500 |

The flasks were covered with parafilm and swirled to facilitate mixing of the solution. After three hours a sample from each flask was taken and analyzed by GC-MS using the conditions specified in Table 6.

TABLE 6

GC-MS Conditions

| | |
|---|---|
| Injector | 250° C., 3 $\mu$L injection, splitless, 1 minute purge |
| SCAN Mode (2nd and 3rd studies only) | MS SCAN mode 32–300 amu, 5.50 minute solvent delay |
| Selected Ion Monitoring (SIM) Mode (all three studies) | MS SIM mode (ions: 60, 95, 94, 129, 166, 130), solvent delay 5.50 minutes |
| Temperature Program | 40° C. (hold 3 minutes) to 130° C. @ 15° C./min |
| Carrier Gas | Helium |
| Column | ZB-5 30 m × 0.250 $\mu$m × 1.00 $\mu$m ft |
| Average Linear Velocity | 36 cm/sec |

Study 2: The same procedure, shown in Table 7, as used for Study 1 was followed, however, 0.375 mL of TCE and PCE were added to the 2.5 L flask. The same amount of chelate was added to the 500 mL flask as earlier. For this study 0.750 mL of TCE and 0.500 mL of PCE were added to the 2.5 L reaction flask.

TABLE 7

Specifications for Study 2

|  | Fe-MGDA Flask 1 | Fe-MGDA Flask 2 | Fe-MGDA Flask 3 |
|---|---|---|---|
| Chelate Added (mL) | 0.500 | 1.000 | 1.500 |

Study 3: The reaction specifications for Study 3 are shown in Table 8. For this study 0.750 mL of TCE and 0.500 mL of PCE were added to the 2.5 L reaction flask. The same amount of chelate was added to the 500 mL flask as earlier.

TABLE 8

Specifications for Study 3

|  | Fe-MGDA Flask 1 | Fe-MGDA Flask 2 | Fe-MGDA Flask 3 |
|---|---|---|---|
| Chelate Added (mL) | 0.250 | 0.500 | 0.750 |

It should be noted that before each study, blank system runs were made on the GC-MS to ensure that the system was stable and free of contaminant peaks. Also, a control sample was taken at time zero from the 2.5 L flask (without any hydrogen peroxide added to it) and analyzed by GC-MS. The peak area of TCE and PCE in the control analysis was compared to the peak areas of TCE and PCE in the five reaction flasks after three hours to calculate relative degradation of TCE and PCE.

The SCAN mode in GC-MS was used to screen for any byproducts or degradation products that may have been generated from the catalytic reaction after three hours. SIM mode was used for a more sensitive and selective monitoring of the specific ions for TCE (60,95,130) and PCE (94,129, 166).

The results of the studies are as seen below in Tables 9-1.

TABLE 9

Relative Degradation of TCE and PCE in Study 1.

| Chelate | Chelate Added (mL) | % Degradation TCE-SIM Mode | % Degradation PCE-SIM Mode |
|---|---|---|---|
| Fe-MGDA | 0.500 | 99.8 | 99.9 |
| Fe-MGDA | 1.000 | 100 | 100 |
| Fe-MGDA | 1.500 | 100 | 100 |

In Study 1, all the TCE and PCE were degraded after three hours using the chelate in varying amounts.

TABLE 10

Relative Degradation of TCE and PCE in Study 2.

| Chelate | Chelate Added (mL) | % Degradation TCE (SCAN) | % Degradation TCE (SIM) | % Degradation PCE (SCAN) | % Degradation PCE (SIM) |
|---|---|---|---|---|---|
| Fe-MGDA | 0.500 | 100 | 100 | 100 | 100 |
| Fe-MGDA | 1.000 | 100 | 100 | 100 | 100 |
| Fe-MGDA | 1.500 | 100 | 100 | 100 | 100 |

It should be noted that in Study 2 the mixture in the 2.5 L flask may indeed have been saturated because there were several droplets in the bottom of the flask that would not dissolve after mixing. In Study 2 using SCAN Mode there were two peaks detected that are not identifiable. One had a significant 57 ion and the other a 77 ion fragment. There were several peaks that appeared sporadically that are most likely siloxane peaks with the 207 ion that come from the column's stationary phase. Again the chelate degraded the TCE and PCE to the point that they were not detected after three hours. It was necessary to conduct a third study to test the limits of the chelate.

TABLE 11

Relative Degradation of TCE and PCE in Study 3

| Chelate | Chelate Added (mL) | % Degradation TCE (SCAN) | % Degradation TCE (SIM) | % Degradation PCE (SCAN) | % Degradation PCE (SIM) |
|---|---|---|---|---|---|
| Fe-MGDA | 0.250 | 92.5 | 95.9 | 97.0 | 98.4 |
| Fe-MGDA | 0.500 | 99.8 | 99.9 | 99.2 | 99.8 |
| Fe-MGDA | 0.750 | 82.3 | 99.4 | 85.7 | 96.0 |

In Study 3, the 2.5 L flask mixture was probably also saturated because there were even more undissolved droplets that remained after mixing. PCE is soluble in 10,000 vol of water while 0.11 g TCE is soluble in 100 g of water. There were undissolved droplets seen in the flask with 0.750 mL of Fe-MGDA, which may explain some of the inconsistency between percent degradation of TCE and PCE in SCAN vs SIM modes for that particular concentration of chelate. An amount of chelate between 0.500 mL and 0.750 mL was sufficient to degrade all detectable TCE and PCE. In fact increasing the amount of chelate from 0.500 mL to 0.750 mL did not significantly increase the overall percent degradation of the two contaminants, suggesting that Fe-MGDA may be effectively used in embodiments of the present invention at even lower concentrations. No additional byproducts were detected in either scan or SIM mode by GC-MS for Study 3. From Study 3 it was shown that by adding as little as 0.500 mL of Fe-MGDA and 0.500 mL of hydrogen peroxide at time zero, that after three hours nearly complete degradation of TCE and PCE in a 500 mL saturated solution has occurred.

Water Treatment Using Fe-MGDA

Calculation of Dose Rates

To determine the optimum dosage rates for Fe-MGDA and hydrogen peroxide in a water treatment application, a Chemical Oxygen Demand (COD) test can be conducted. The COD test can indicate how much oxygen is needed to oxidize all oxidizable organic and inorganic chemical compounds within a given water sample. The COD test can assist with estimating the dose rates for hydrogen peroxide and/or for Fe-MGDA.

Once a COD result is determined, it can be calculated that approximately three times the mass of the COD value in mg/l can be an effective amount of hydrogen peroxide to be added. For example, if the COD were approximately 100 mg/l, then an appropriate dose of hydrogen peroxide would be approximately 300 mg/l.

The Fe-MGDA can be added at a rate that equates to approximately 7.8% of the hydrogen peroxide dose rate. Therefore, if approximately 300 mg/l of hydrogen peroxide is used in the example above, then approximately 7.8% of 300 mg/l of Fe-MGDA would be needed or approximately 23.4 mg/l of Fe-MGDA.

Application of Treatment Chemicals

In some embodiments, the Fe-MGDA and oxidizing agent can be added together immediately before contacting the contaminated water. Typically, this can be accomplished in-line prior to a retention tank and/or flask. The contaminated water, chelate, and oxidizing agent can be mixed rapidly after addition of the reactants.

Research has indicated that about three hours or less of contact time can fully complete and/or deplete the oxidation capacity of the Fe-MGDA and oxidizing agent mixture.

Example 3

On-Site Water Treatment Using Fe-MGDA

Table 12 shows pre-treatment and post-treatment concentrations of phenol, oil & grease, and hydrogen sulfide contamination in water taken from a large tank, the contaminated water treated according to an embodiment of a method of the present invention. The row labled "Pretreat" represents the concentration of contaminants in the tank prior to sampling and treatment.

Treatment was performed four times, using two different treatment tanks. On two separate occasions, the first treatment tank was filled with 500 gallons of contaminated water, and then a mixture of 0.5 gallons of Fe-MGDA and 1.0 gallons of 35% hydrogen peroxide, was introduced and allowed to react for 3 hours. The contamination remaining in the tank was then analyzed and is presented in Table 12 as rows 1A and 1B.

Likewise, on two separate occasions, the second treatment tank was filled with 500 gallons of contaminated water, and then a mixture of 1.0 gallons of Fe-MGDA and 1.0 gallons of 35% hydrogen peroxide, was introduced and allowed to react for 3 hours. The contamination remaining in the tank was then analyzed and is presented in Table 12 as rows 2A and 2B.

TABLE 12

| Sample | TOC (PPM) | Phenol (PPM) | Oil & Grease (PPM) | Sulfides (PPM) |
|---|---|---|---|---|
| Pretreat | 202 | 13.2 | 207 | 0.88 |
| 1A | 214 | n/a* | n/a | n/a |
| 1B | 252 | 1.015 | 5.4 | 0.025 |
| 2A | 208 | n/a | n/a | n/a |
| 2B | 186 | 0.01 | 6.5 | 0.03 |

*Note: n/a indicates that the test was not conducted.

Example 4

Bench Treament Water Treatment Using Fe-MGDA

Table 13 shows pre-treatment and post-treatment concentrations (in parts per billion) of numerous contaminants in water, the contaminated water treated according to an embodiment of a method of the present invention. Each of the contaminants was dissolved in separate flasks containing 500 milliliters of water. Each of the flasks was treated with 1.0 mL of Fe-MGDA and 1.0 mL of 35% hydrogen peroxide.

| Contaminant | CAS # | Before Treatment (PPB) | After Treatment (PPB) |
|---|---|---|---|
| Benzene | 71-43-2 | 310,563 | ND* |
| Toluene | 108-88-3 | 163,221 | ND |
| trans 1,2-Dichloropropane | 156-80-5 | 143,709 | ND |
| Trichloroethane | 79-01-6 | 897,876 | 9,876 |
| 1,1-Dichloroethane | 75-35-4 | 56,876 | ND |
| Tetrachloroethane | 127-16-4 | 543,867 | 10,857 |
| cis 1,2-Dichloroethane | 156-59-2 | 334,006 | 19295 |
| 1,2 Dichloroethane | 107-06-2 | 232,756 | ND |
| Ethylbenzene | 100-41-4 | 42,867 | ND |
| Chloroform | 67-66-3 | 32,657 | ND |
| 1,1,1,2-Tetrachloroethane | 630-20-6 | 33,678 | 6,765 |
| Napthalene | 91-20-3 | 212,687 | ND |
| 1,1,2-Trichloroethane | 79-00-5 | 345,768 | 7,456 |
| o-Xylene | 95-47-6 | 30,622 | ND |
| 1,1,2,2-Tetrachloroethane | 79-34-5 | 57,687 | ND |
| Vinyl chloride | 75-01-4 | 9,876 | ND |

*Note: ND indicates non-detectable.

Example 5

Open Pit Water Treatment

Tables 14 and 15 show pre-treatment and post-treatment concentrations of various contaminants in two large pit excavations containing significant solvent and petroleum hydrocarbon contamination, the contaminated water in the pits treated according to an embodiment of a method of the present invention.

TABLE 14

| Sample | TCE | Cis 1,2 DCE | 1,1 DCE | 1,1,1 TCA | 1,1 DCA |
|---|---|---|---|---|---|
| Pre-Treated | 32,200 PPB | 11,400 PPB | 3,380 PPB | 60,300 PPB | 14,400 PPB |
| Post-Treated | <1,000 PPB | <1,000 PPB | <1,000 PPB | 6,430 PPB | <1,010 PPB |

TABLE 15

| Sample | 1,2,4 TMB | Ethylbenzene | Benzene | Toluene | Xylenes | Propylbenzene |
|---|---|---|---|---|---|---|
| Pre-Treated | 1,180 PPB | 170 PPB | 223 PPB | 2,170 PPB | 3,910 PPB | 171 PPB |
| Post-Treated | 5.13 PPB | 1.8 PPB | ND | 6.59 PPB | 16.1 PPB | 2.55 PPB |

Example 6

In Situ Groundwater Treatment

Utilizing an embodiment of a method of the present invention, contaminated groundwater was treated via in situ injection with Fe-MGDA and a peroxide in amounts effective to oxidize at least a portion of the contaminants. Specifically, TCE contamination was reduced from 32,200 parts per billion (PPB) to a non detection level, and TCA contamination was reduced from 63,000 PPB to 6,300 PPB.

Example 7

Ex Situ Soil Treatment

Utilizing an embodiment of a method of the present invention, contaminated soil was treated ex situ with Fe-MGDA and a peroxide in amounts effective to oxidize at least a portion of the contaminants. Tables 16 and 17 detail specific contaminants and their pre-treatment and post-treatment concentrations.

TABLE 16

| Contaminant | Pre Treatment PPM | 1st Post Treatment PPM (average) | 2nd Post Treatment PPM (average) | % Reduction |
|---|---|---|---|---|
| 1,1,1 Trichloroethane | 3201.0 | 45.78 | 0.92 | >99.9% |
| 1,1 Dichloroethane | 52.8 | 0.33 | ND (Non Detect) | 100% |
| 1,2 Dichlorobenzene | 44.6 | 0.76 | 0.07 | >99.9% |
| Tetrachloroethane | 78.3 | ND | ND | 100% |
| Trichloroethene | 242.3 | 9.7 | ND | ND |

TABLE 17

| Contaminant | Pre Treatment PPM | Post Treatment PPM (average) | % Reduction |
|---|---|---|---|
| 1,1,1 Trichloroethane | 53.2 | 0.743 | 98.6% |
| 1,1 Dichloroethane | 4.2 | ND | 100% |
| 1,2 Dichloroethane | 0.435 | ND | 100% |
| 1,2,4 Trimethylbenzene | 0.208 | ND | 100% |
| 1,2 Dichlorobenzene | 0.204 | ND | 100% |
| 1,3,5 Trimethylbenzene | 0.101 | ND | 100% |

Example 8

Biological Treatment

Utilizing an embodiment of a method of the present invention, a consortium of bacteria was treated with Fe-MGDA and a peroxide in amounts effective to disinfect at least a portion of the bacteria.

The consortium of bacteria used within the study were grown in a one liter fermentation vessel to a cell density estimated to be in excess of $1 \times 10^8$ colony forming units (CFUs) per milliliter. The consortium were grown within a fermentation vessel utilizing petroleum diesel range organics as a carbon food source in a nutrient broth containing dipotassium phosphate, ammonium chloride, ammonium nitrate, ferric sulfate, magnesium sulfate, sodium bicarbonate, calcium chloride and water. Once inoculated the vessel was continuously aerated. The diesel range carbon food source was added as needed during a growth period of 60 days.

The bacteria utilized were identified as common, non-pathogenic facultative soil bacteria as given below.

| | |
|---|---|
| *Pseudomonas putida* | *Alcaligenes xylosoxydans* |
| *Corynebacterium aquaticum* | *Agrobacterium tumefaciens* |
| *Arthrobacter crystallopoietes* | *Ochrobactrum anthropi* |
| *Pseudomonas aeruginosa* | *Pseudomonas alcaligenes* |

Ten one-liter Erlenmeyer flasks were filled to the one liter level with deionized distilled water. Alkalinity was added to each test flask to achieve carbonate alkalinity levels of 100 PPM as calcium carbonate. The flasks were autoclaved for 30 minutes at 121° C. as per the method outlined in Standard Methods for the Examination of Water and Wastewater, 19th edition, American Water Works Association. Upon cooling, each flask was inoculated with one milliliter of bacterium harvested from the continuously mixed fermentation unit.

Table 18 details the manner in which each of the ten flasks was treated.

TABLE 18

| Flask Number | 35% Hydrogen Peroxide Added | Fe-MGDA Catalyst Added |
| --- | --- | --- |
| Flask 1-R1 | None | None |
| Flask 2-R2 | None | None |
| Flask 3-C1 | 0.05 mL | None |
| Flask 4-T1 | 0.05 mL | 0.05 mL |
| Flask 5-C2 | 0.1 mL | None |
| Flask 6-T2 | 0.1 mL | 0.1 mL |
| Flask 7-C3 | 0.5 mL | None |
| Flask 8-T3 | 0.5 mL | 0.5 mL |
| Flask 9-C4 | 1.0 mL | None |
| Flask 10-T4 | 1.0 mL | 1.0 mL |

Treated flasks receiving hydrogen peroxide and/or Fe-MGDA catalyst were swirled after receiving the dosage for 10 seconds to achieve a uniform mixture. Once the flasks were treated they were allowed to sit for 30 minutes at room temperature. Each flask was swirled for 10 seconds before samples were collected in the appropriate sterilized vessels and placed on ice for shipment to the analytical lab under EPA recognized chain-of-custody protocol.

Each sample was tested for Heterotrophic Bacterial Plate Counts (HPC) in colony forming units (CFUs) per milliliter. Table 19 provides the count results for the Raw, Hydrogen Peroxide Only, and Hydrogen Peroxide/Catalyst treatments.

TABLE 19

| Sample Identification | Heterotrophic Plate Count |
| --- | --- |
| R1 (Raw Untreated Sample) | >57,000 CFU/mL |
| R2 (Raw Untreated Sample) | >57,000 CFU/mL |
| C1 (Hydrogen Peroxide Only) | 720 CFU/mL |
| C2 (Hydrogen Peroxide Only) | 630 CFU/mL |
| C3 (Hydrogen Peroxide Only) | 10 CFU/mL |
| C4 (Hydrogen Peroxide Only) | <10 CFU/mL |
| T1 (Hydrogen Peroxide/Fe-MGDA Catalyst) | 10 CFU/mL |
| T2 (Hydrogen Peroxide/Fe-MGDA Catalyst) | <10 CFU/mL |
| T3 (Hydrogen Peroxide/Fe-MGDA Catalyst) | <10 CFU/mL |
| T4 (Hydrogen Peroxide/Fe-MGDA Catalyst) | <10 CFU/mL |

It is apparent that hydrogen peroxide alone successfully reduced the heterotrophic bacterial counts substantially from >57,000 CFUs/mL seen in the raw untreated samples. However, at 0.05 and 0.1 milliliters of hydrogen peroxide there remained 720 and 630 CFUs/mL, respectively. At the 0.5 mL dosage of peroxide, the bacteria were at the low end of detection at 10 CFUs/mL. It was apparent that the bacteria were not detectable at the highest level of treatment in sample C4.

Treatments of hydrogen peroxide and Fe-MGDA catalyst were uniformly effective at all dosages. Only the lowest dosage of 0.05 mL/s (Sample T1) retained a countable level of bacterium at the very low end of detection at 10 CFUs/mL. All other treatments were documented at <10 CFUs/mL.

Example 9

Hydrogen Sulfide Treatment

Wastewater Treatment

Utilizing an exemplary embodiment, contamination was reduced in municipal wastewater flowing into the head works at a Northern California Wastewater Treatment Plant (NCWWTP) that treats 30 million gallons per day. Influent air hydrogen sulfide concentrations ranged as high as 250 PPM with an overnight average of 123 PPM prior to treatment. For the period of the study, average hydrogen sulfide readings from air monitoring equipment upstream of the Fe-MGDA treatment were 102 PPM. Influent hydrogen sulfide concentrations ranged from 7 to 10 PPM within the wastewater at the head works prior to implementation of Fe-MGDA treatment.

The high levels of hydrogen sulfide measured within the wastewater exceeded the expected influent concentration (~3 PPM). Feed pumps selected for the project were, therefore, slightly undersized to achieve complete oxidation of the hydrogen sulfide. The objective of the study was to reduce the levels of hydrogen sulfide within the wastewater to a point that allowed for acceptable levels of hydrogen sulfide within the air (i.e. <10 PPM).

An injection point upstream of the bar screens allowed the Fe-MGDA peroxide contact time of less than 3 minutes. Metering rates for the 50% hydrogen peroxide were set to deliver 500 gallons per day into a wastewater flow of 30 million gallons per day. Fe-MGDA was metered at a range of application approximating 40 gallons per day. Injection rates were adjusted proportionally with the flow of the plant. Hydrogen peroxide and Fe-MGDA were metered into the wastewater line with anticipation that proper mixing could occur within the line prior to exiting at the headworks. It is surmised that better mixing at the injection point can result in improved performance. Both air and water samples of hydrogen sulfide were taken from the wastewater stream prior to treatment and at the bar screen at selected times throughout the study. Air samples were taken by utilizing the onsite air monitoring systems located at the headworks and within the air prior to and immediately after treatment.

The average concentration seen through the study was 7.7 PPM prior to treatment, while after the treatment the hydrogen sulfide concentrations at the bar screens was from 2 to 3 PPM. Atmospheric hydrogen sulfide showed consistent reductions within the influent trunk from an average of 123 PPM to about 4 PPM at the bar screen. No alarms were detected in the headworks maintenance room during the study, indicating that levels were reduced below the acceptable 10 PPM limitation. The alarm sounded frequently prior to treatment with Fe-MGDA.

The Fe-MGDA process was successful in reducing hydrogen sulfide levels within the air and wastewater at the NCWWTP headworks. Levels of hydrogen sulfide were reduced within the air from levels ranging from 102 PPM to 250 PPM to less than 10 PPM throughout the study. Wastewater hydrogen sulfide levels were reduced from an average of 7.7 PPM to approximately 3 PPM over the course of the study, which correlates to an estimated mass reduction of approximately 1200 pounds of hydrogen sulfide. The Fe-MGDA process worked rapidly with most of the treatment being accomplished within 3 minutes of contact time. Additional study can be useful to determine if more efficient mixing at the injection point would improve the efficiency of the process.

Waste Stream Treatment

Utilizing an exemplary embodiment, testing at the waste stream at Giant Refinery in Yorktown, Va. demonstrated that the following amounts of Fe-MGDA catalyst and hydrogen peroxide could convert and/or degrade hydrogen sulfide, possibly to elemental sulfur. The dosages reflect the volumes of the two chemicals for treatment of 1,000 PPM of hydrogen sulfide per 1,000 gallons of target wastewater. Therefore, if a user were to find, for example, 2,200 PPM of hydrogen sulfide in a refinery waste stream, the dose rates could be 2.2 times the following rates:

| Additive | Gallons of Additives |
| --- | --- |
| 50% Hydrogen Peroxide | 2.0 gallons/1,000 gallons/1000 PPM H$_2$S |
| Fe-MGDA Catalyst | 0.6 gallons/1,000 gallons/1000 PPM H$_2$S |

For this situation, it was apparent that the efficiency of the catalyzed process falls off at low pH (i.e. pH<5) and at the elevated pH of the initial waste stream (pH>9.6). The preferred pH for optimal efficiency was between about 5 and about 9.6, including all values therebetween, such as about 5.51, 6.002, 6.5, 6.8, 7.1, 7.503, 7.998, 8.5, etc., and including all subranges therebetween, such as from about 6.5 to about 6.999, etc.

Sour Water Waste Stream

In another exemplary embodiment, a sour water discharge waste stream from the BP Refinery outside of London, England was treated with Fe-MGDA and hydrogen peroxide. Initially, the sour waste stream contained 3,707 PPM of hydrogen sulfide. An equivalent dose rate of 8 mL/s of 50% hydrogen peroxide/liter of wastewater and 2.5 mL/s of concentrated Fe-MGDA catalyst/liter of wastewater were added to the raw sample. The Fe-MGDA and hydrogen peroxide were added simultaneously and mixed vigorously into the sample. Test results indicated that hydrogen sulfide levels registered at non-detectable shortly after treatment (<5 minutes).

In another exemplary embodiment, Fe-MGDA and hydrogen peroxide were used to treat landfill leachate laden with significant levels of hydrogen sulfide and other odorous compounds. Such a leachate is consistently pumped from the Prince William County, Va. landfill to the local sewage authority. The odor from the untreated leachate was responsible for significant complaints from citizens and personnel at the receiving wastewater treatment facility. The landfill was notified to cease and desist discharge until a suitable treatment for the leachate could be found.

It was determined that Fe-MGDA and hydrogen peroxide could eliminate the odor-causing chemicals within the leachate. The leachate was pumped via sump pumps located within the landfill cells into a 5,000 gallon retention tank. Fe-MGDA and 35% hydrogen peroxide were metered into the leachate within the influent line prior to entering the retention tank. Flow from the landfill was approximately 100 gallons per minute but the flow was intermittent. Leachate flowed into a 5000 gallon batch treatment tank along with Fe-MGDA and hydrogen peroxide. The flow rate of hydrogen peroxide was metered at a flow rate of approximately ~0.2 gallon per batch. The Fe-MGDA catalyst was metered at ~0.1 gallons per batch.

Once the Fe-MGDA and hydrogen peroxide treatment was initiated, odors were immediately eliminated from the influent stream. Hydrogen sulfide levels were reduced from ~50 PPM within the influent to non-detectable levels within a minimal amount of retention time. Treatability studies indicated that hydrogen sulfide could be reduced to acceptable levels essentially upon contact. Complaints of odors by the citizenry and wastewater plant personnel ceased while the treatment system was operational. Of interest was the observation that after running the system for ten days, treatment was halted for a brief period of time, which immediately brought complaints regarding the landfill. Once the Fe-MGDA and hydrogen peroxide treatment system was restarted the odors dissipated and complaints ceased.

It should be understood that the preceding is merely a detailed description of one or more exemplary embodiments of this invention and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims, every element of which can be replaced by any one of numerous equivalent alternatives without departing from the spirit or scope of the invention, only some of which equivalent alternatives are disclosed in the specification.

What is claimed is:

1. A method of reducing hydrogen sulfide content in a medium, comprising:
    adding Fe-MGDA and a peroxide to a medium with a hydrogen sulfide content; and
    reducing the hydrogen sulfide content in the medium.

2. The method of claim 1, wherein the hydrogen sulfide content is lowered though an oxidation reaction.

3. The method of claim 1, further comprising reducing the hydrogen sulfide content to a non-detectable amount.

4. The method of claim 1, further comprising reducing odors caused by hydrogen sulfide.

5. The method of claim 1, further comprising preparing the Fe-MGDA.

6. The method of claim 1, further comprising contacting iron and MGDA to form Fe-MGDA.

7. The method of claim 1, further comprising contacting Fe-MGDA and the peroxide to form a reaction product.

8. The method of claim 1, further comprising contacting Fe-MGDA and the peroxide to form an oxidizing agent.

9. The method of claim 1, further comprising mixing Fe-MGDA and the peroxide prior to adding to the medium containing hydrogen sulfide.

10. The method of claim 1, further comprising mixing Fe-MGDA and the peroxide after addition to the medium containing hydrogen sulfide.

11. The method of claim 1, further comprising adding Fe-MGDA and the peroxide simultaneously to the medium containing hydrogen sulfide.

12. The method of claim 1, further comprising adding Fe-MGDA and the peroxide sequentially to the medium containing hydrogen sulfide.

13. The method of claim 1, further comprising conveying a mixture of the Fe-MGDA and peroxide to the medium containing hydrogen sulfide.

14. The method of claim 1, further comprising dispersing a mixture of Fe-MGDA and the peroxide in liquid form.

15. The method of claim 1, further comprising dispersing a mixture of Fe-MGDA and the peroxide in foam form.

16. The method of claim 1, further comprising dispersing a mixture of Fe-MGDA and the peroxide in solid form.

17. The method of claim 1, further comprising dispersing a mixture of Fe-MGDA and the peroxide in gaseous form.

18. The method of claim 1, further comprising dispersing a mixture of Fe-MGDA and the peroxide in aerosol form.

19. The method of claim 1, further comprising dispersing a mixture of Fe-MGDA and the peroxide in vapor form.

20. The method of claim 1, further comprising determining an optimal dose rate for the Fe-MGDA added to the medium.

21. The method of claim 1, further comprising determining an optimal pH for removing hydrogen sulfide from the medium.

22. The method of claim 1, wherein the pH for reducing the hydrogen sulfide content is between approximately 5 and approximately 9.6.

23. The method of claim 1, further comprising determining an optimal dose rate for the peroxide added to the medium.

24. The method of claim 1, further comprising conveying the medium after treatment with Fe-MGDA and the peroxide.

25. The method of claim 1, further comprising discharging the medium after treatment with Fe-MGDA and the peroxide.

26. The method of claim 1, further comprising measuring the levels of hydrogen sulfide before treatment with Fe-MGDA and the peroxide.

27. The method of claim 1, further comprising measuring the levels of hydrogen sulfide after treatment with Fe-MGDA and the peroxide.

28. The method of claim 1, further comprising determining a reduction in hydrogen sulfide associated with the medium.

29. The method of claim 1, further comprising reducing hydrogen sulfide concentration in the medium to less than approximately 50 parts per million.

30. The method of claim 1, further comprising reducing hydrogen sulfide concentration in the medium to less than approximately 20 parts per million.

31. The method of claim 1, further comprising reducing hydrogen sulfide concentration in the medium to less than approximately 10 parts per million.

32. The method of claim 1, further comprising reducing hydrogen sulfide concentration in the medium to less than approximately 5 parts per million.

33. The method of claim 1, further comprising reducing hydrogen sulfide concentration in the medium to less than approximately 1 part per million.

34. The method of claim 1, further comprising reducing hydrogen sulfide concentration in the medium to approximately non-detectable levels.

35. The method of claim 1, wherein the medium containing hydrogen sulfide is selected from: liquid, water, groundwater, leachate, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, spent ultrapure water, sour water, waste stream water.

36. The method of claim 1, wherein the medium is selected from: a solid, solids, biosolids, rubbish, trash, refuse, waste, medical waste, radioactive waste, sweepings, scourings, rubble, debris, detritus, scum, grease, sludge, sewage, jetsam, flotsam, soil, clay, dust, sand, gravel, stones, rock, sediment, activated charcoal, paint, chemical mixture.

37. The method of claim 1, wherein the medium containing the hydrogen sulfide is a vapor.

38. The method of claim 1, wherein the medium containing the hydrogen sulfide is a liquid.

39. The method of claim 1, wherein the medium containing the hydrogen sulfide is a slurry.

40. A method for removing hydrogen sulfide from a medium, comprising contacting the medium with a reaction product of Fe-MGDA and a peroxide.

41. A method of degrading hydrogen sulfide comprising:
contacting a medium containing hydrogen sulfide with a reaction product of Fe-MGDA and a peroxide; and
oxidizing the hydrogen sulfide.

42. A method of degrading hydrogen sulfide comprising:
contacting a medium containing hydrogen sulfide with a reaction product of Fe-MGDA and a peroxide; and
oxidizing the hydrogen sulfide.

43. The method of claim 42, wherein the reaction product is an oxidizing agent.

44. A method for reducing a concentration of a contaminant associated with a medium, comprising:
treating the medium with Fe-MGDA and an oxidizing agent; and
reducing an odor produced by the contaminant.

45. A method for treating sewers, comprising:
adding Fe-MGDa and a peroxide to a medium within a sewer; and
reducing the content of a contaminant within the medium.

46. The method of claim 45, wherein at least one of the Fe-MGDA and the peroxide are in a vapor form.

47. The method of claim 45, wherein at least one of the Fe-MGDA and the peroxide are in a liquid form.

48. The method of claim 45, wherein the contaminant is in a vapor form.

49. The method of claim 45, wherein the contaminant is in a liquid form.

50. The method of claim 45, wherein the contaminant is in solid form.

51. The method of claim 45, wherein the Fe-MGDA is added at a constant rate.

52. The method of claim 45, wherein the FE-MGDA is added at a variable rate.

53. The method of claim 45, wherein the FE-MGDA is added intermittently.

54. The method of claim 45, wherein the peroxide is added at a constant rate.

55. The method of claim 45, wherein the peroxide is added at a variable rate.

56. The method of claim 45, wherein the peroxide is added intermittently.

* * * * *